(12) United States Patent
Espeseth et al.

(10) Patent No.: US 10,048,876 B2
(45) Date of Patent: Aug. 14, 2018

(54) METHOD FOR PROVIDING NONVOLATILE STORAGE WRITE BANDWIDTH USING A CACHING NAMESPACE

(71) Applicant: HGST Netherlands B.V., Amsterdam (NL)

(72) Inventors: Adam Michael Espeseth, Rochester, MN (US); Colin Christopher McCambridge, Rochester, MN (US); David George Dreyer, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 14/850,802

(22) Filed: Sep. 10, 2015

(65) Prior Publication Data

US 2017/0075591 A1     Mar. 16, 2017

(51) Int. Cl.
*G06F 3/06* (2006.01)
*G06F 12/0831* (2016.01)

(52) U.S. Cl.
CPC .......... *G06F 3/0613* (2013.01); *G06F 3/0655* (2013.01); *G06F 3/0688* (2013.01); *G06F 12/0833* (2013.01); *G06F 2212/621* (2013.01)

(58) Field of Classification Search
CPC .... G06F 3/0613; G06F 3/0655; G06F 3/0688; G06F 12/0833; G06F 2212/621
See application file for complete search history.

(56) References Cited

U.S. PATENT DOCUMENTS

| | | | |
|---|---|---|---|
| 8,838,891 B2 | 9/2014 | Bert | |
| 8,868,875 B2 | 10/2014 | Tressler et al. | |
| 2006/0143256 A1* | 6/2006 | Galchev | G06F 12/084 |
| 2008/0228992 A1* | 9/2008 | Dumitru | G06F 3/0613 |
| | | | 711/100 |
| 2011/0138106 A1* | 6/2011 | Prabhakaran | G06F 12/0804 |
| | | | 711/103 |
| 2014/0101379 A1 | 4/2014 | Tomlin | |

(Continued)

OTHER PUBLICATIONS

Lifetime Management of Flash-Based SSDs Using Recovery-Aware Dynamic Throttling http://static.usenix.org/events/fast/tech/full_papers/Lee.pdf https://www.usenix.org/legacy/events/fast/tech/slides/Lee.pdf, 2012.

(Continued)

*Primary Examiner* — Larry T Mackall
(74) *Attorney, Agent, or Firm* — McDermott Will & Emery LLP

(57) ABSTRACT

An apparatus for implementing an enhanced-write-bandwidth caching stream includes a memory that stores machine instructions and a processor that executes the machine instructions. The apparatus receives a first host write stream and a second host write stream that comprises latency-sensitive host write requests. The apparatus also subjects the first host write stream to host-write throttling, and exempts the second host write stream from host-write throttling. The apparatus further requires that the second host write stream invalidate logical blocks in an order corresponding to a previous order in which the respective logical blocks were previously programmed.

13 Claims, 7 Drawing Sheets

(56) References Cited

U.S. PATENT DOCUMENTS

2014/0181369 A1    6/2014  Horn
2016/0062884 A1*  3/2016  Kim .................... G06F 12/0246
                                                                711/103

OTHER PUBLICATIONS

EMC Releases the New VNXe 3200 http://jasonnash.com/2014/04/30/emc-releases-the-new-vnxe-3200/, Apr. 30, 2014.
The Why and How of SSD Over Provisioning http://www.sandisk.com/assets/docs/WP004_OverProvisioning_WhyHow_FINAL.pdf, Nov. 2013.

* cited by examiner

METHOD FOR PROVIDING NONVOLATILE STORAGE WRITE BANDWIDTH USING A CACHING NAMESPACE

CROSS-REFERENCE TO RELATED APPLICATIONS

This application is related to U.S. patent application Ser. No. 14/850,741 concurrently filed herewith, entitled METHOD FOR PROVIDING NONVOLATILE STORAGE WRITE BANDWIDTH USING A CACHING NAMESPACE, the entire disclosure of which is incorporated herein by reference.

TECHNICAL FIELD

This description relates generally to nonvolatile storage devices, and more particularly to defining a logical cache reserve to provide write bandwidth in a nonvolatile storage device.

BACKGROUND

Nonvolatile storage devices are used as primary and secondary data storage in computer systems. Some existing nonvolatile storage devices implement arrays of flash memory cells based on floating-gate transistor technology, such as NAND flash memory cells, to store electronic data in a format that can persist without a continuous power supply. The data typically consists of computer instructions, numerical data, application programs, operating systems, and the like.

The implementation of certain types of nonvolatile storage devices requires that fixed-size sections, or blocks, of memory cells with previously-stored data be erased before being reprogrammed with new data. Typically, the size of these blocks is larger than the size of fixed-size sections, or pages, of memory cells that can be programmed.

The conventional process of moving valid data remaining in portions of a block of memory cells before erasing the block and making the block available for reprogramming, collectively referred to as garbage collection, results in nonvolatile memory write operations that do not directly serve host (user) write requests. The total amount of data written in the nonvolatile memory over time—including host-request write operations, garbage collection write operations, and other storage device write operations—as a ratio to the amount of host (user) data written is known as write amplification.

Since the program/erase (P/E) lifecycle, or endurance, of typical nonvolatile memory cells is limited, some existing nonvolatile storage devices have implemented measures to extend the lifespan, or the perceived lifespan, of the nonvolatile storage devices. For example, typical nonvolatile storage devices present less total logical address space to hosts than the actual capacity of the memory cells in the device, known as over-provisioning. In addition, some nonvolatile storage devices limit the quantity of host writes over time based on the current amount of storage space available for programming or reprogramming, a practice known as throttling.

However, particular nonvolatile storage use cases can be relatively sensitive to write latency and require relatively high write performance on an on-demand basis for relatively limited amounts of data. For example, limited-capacity, on-demand write bandwidth can be required to save the main memory contents and processor state during the initiation of system hibernation mode. As a result, host-write throttling can hinder desired performance regarding certain use cases.

SUMMARY

According to one embodiment of the present invention, an apparatus for implementing an enhanced-write-bandwidth caching stream includes a memory that stores machine instructions and a processor that executes the machine instructions. The apparatus receives a first host write stream and a second host write stream that comprises latency-sensitive host write requests, subjects the first host write stream to host-write throttling, and exempts the second host write stream from host-write throttling. The apparatus further requires that the second host write stream invalidate logical blocks in an order corresponding to a previous order in which the respective logical blocks were previously programmed.

According to another embodiment of the present invention, an apparatus for implementing an enhanced-write-bandwidth caching stream includes a memory that stores machine instructions and a processor that executes the machine instructions. The apparatus divides a stream of host write requests into a first host write stream and a second host write stream that comprises latency-sensitive host write requests. The apparatus further invalidates logical blocks corresponding to the second host write stream in an order corresponding to a previous order in which the respective logical blocks were previously programmed.

According to yet another embodiment of the present invention, a computer-implemented method for implementing an enhanced-write-bandwidth caching stream includes apportioning a first address space and a second address space associated with a storage device, the second address space comprising a logical namespace. The method also includes subjecting the first address space to host-write throttling, and exempting the second address space from host-write throttling. The method further includes requiring that logical block addresses corresponding to the second address space be invalidated in an order corresponding to a previous order in which the respective logical blocks were previously programmed.

The details of one or more embodiments of the invention are set forth in the accompanying drawings and the description below. Other features, objects, and advantages of the invention will be apparent from the description and drawings, and from the claims.

DETAILED DESCRIPTION

An embodiment of the present invention defines a reserved logical namespace for caching in a storage device. The caching namespace is exempted from host-write throttling with respect to stored data sets up to the size of the namespace, irrespective of other workloads simultaneously being executed in other namespaces of the storage device. In general, host writes to the reserved namespace are not blocked by storage device reclamation (garbage collection) activities. The corresponding host system is responsible for invalidating, or deallocating, data in the caching namespace, for example, using a TRIM command, to indicate the storage area can be reclaimed in preparation the next caching use of the namespace.

Figure 1:
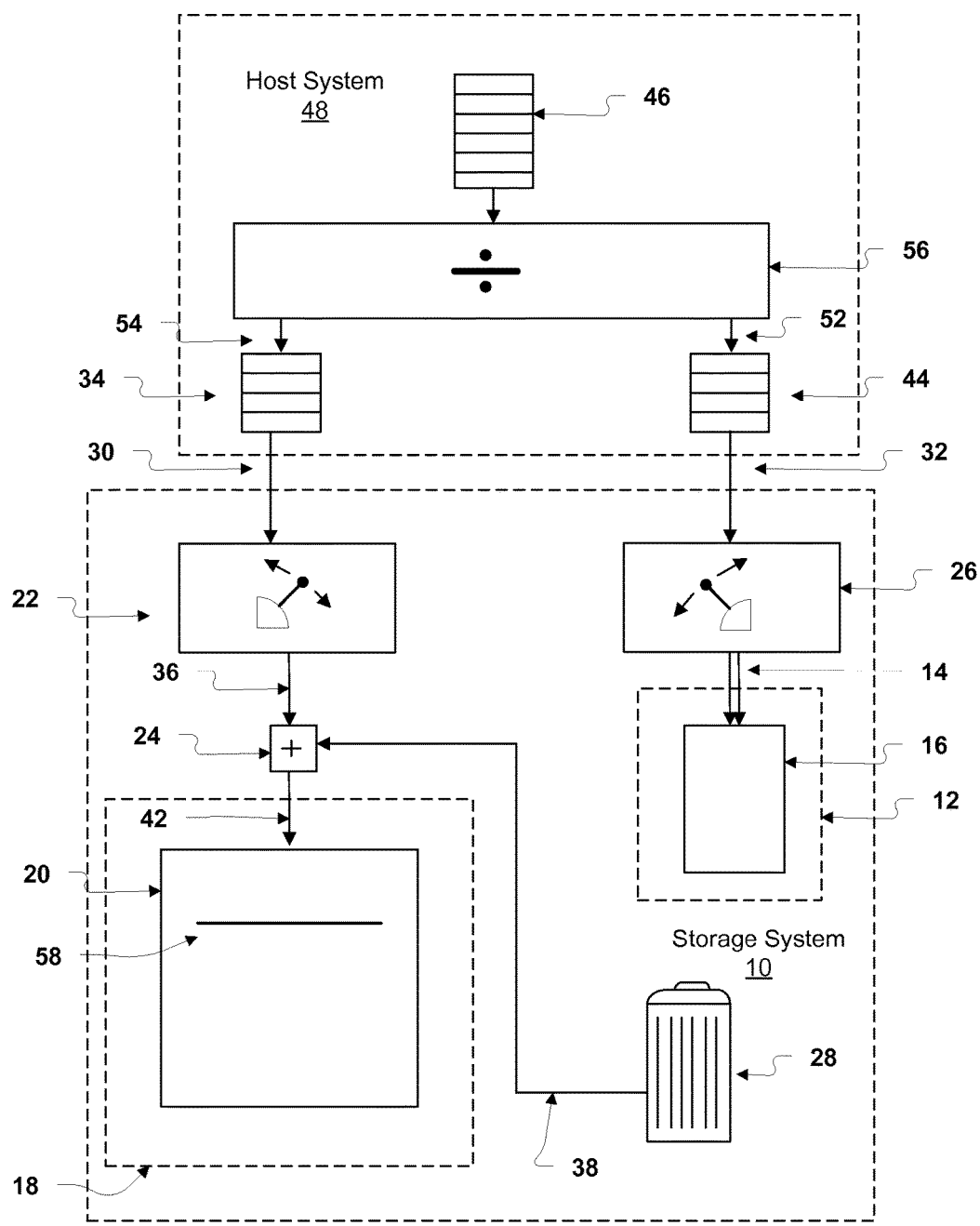
FIG. 1 is a schematic diagram depicting an exemplary enhanced-write-bandwidth caching stream using an enhanced-write-bandwidth address space in accordance with an embodiment of the present invention.

An embodiment of the present invention is shown in FIG. 1, which illustrates an exemplary storage system 10 that employs an enhanced-write-bandwidth address space 12 in order to implement an enhanced-write-bandwidth caching stream 14. The storage system 10 includes the enhanced-write-bandwidth address space 12, an enhanced-write-bandwidth available blockset pool 16, a general address space 18, a general available blockset pool 20, a general throttling mechanism 22, a write stream aggregator 24, an enhanced throttling mechanism 26 and a reclamation engine 28.

A host system 48 is communicatively connected to the storage system 10, for example, by way of a storage bus or a communication network, in order to send host data to the storage system 10. Host write requests 46 generated by the host system 48 associated with the storage system 10 are divided into separate write data streams, including a latency-sensitive write stream 52 and a general host write stream 54 by a write request divider 56.

A buffered host write stream 30 feeds general host write requests 34 into the general throttling mechanism 22, which generates a reclamation-balanced host write stream 36. Storage devices that implement NAND flash memory conventionally attempt to approximately balance host write throughput with reclamation (garbage collection) activities that reclaim free space available for programming for future write operations. Typical systems temporarily or intermittently reduce host-write throughput as needed to maintain relatively acceptable maximum command response times and to allow reclamation activities to keep up with ongoing host writes.

As known in the art, storage devices utilizing NAND flash memory typically employ a logical construct consisting of multiple blocks of memory cells over which garbage collection activities are coordinated, for example, a blockset including an integer number of NAND blocks (also referred to as erase blocks). The reclamation engine 28 generates a reclamation write stream 38, which is combined with the reclamation-balanced host write stream 36 by the write stream aggregator 24 to create an aggregate general write stream 42 that feeds into the general available blockset pool 20 in the general address space 18. In an alternative embodiment, the reclamation write stream 38 remains independent of the reclamation-balanced host write stream 36, which can help separate relatively dynamic, or "hot," data from relatively static, or "cold," data.

So long as the amount of programmable space available in the general available blockset pool 20 remains above a predetermined throttling threshold 58, the general throttling mechanism 22 does not modify the throughput of the reclamation-balanced host write stream 36, which remains the same as that of the buffered host write stream 30. However, during periods when the programmable space available in the general available blockset pool 20 drops below the throttling threshold 58, the general throttling mechanism 22 reduces the throughput of the reclamation-balanced host write stream 36 from that of the buffered host write stream 30 in order to afford increased prioritization to reclamation write requests and avoid free blockset starvation, which can be perceived by the host as a quality of service disruption.

The enhanced-write-bandwidth address space 12 of the storage system 10 generally is not subject to internal host write throttling, which attempts to approximately equalize the host write throughput with the rate of the ongoing reclamation process. While throttling generally is provided with regard to the general host write stream 54, the latency-sensitive write stream 52 generally is guaranteed the maximum realizable throughput based on the available resources.

The buffered latency-sensitive write stream 32 feeds latency-sensitive write requests 44 into the enhanced throttling mechanism 26. The enhanced-write-bandwidth caching stream 14 feeds latency-sensitive write requests 44 from the enhanced throttling mechanism 26 into the enhanced-write-bandwidth available blockset pool 16 in the enhanced-write-bandwidth address space 12.

So long as programmable space is available in the enhanced-write-bandwidth available blockset pool 16, the enhanced-write-bandwidth caching stream 14 is not modified by the enhanced throttling mechanism 26. However, if the enhanced-write-bandwidth available blockset pool 16 does not have any programmable space available, the throughput of the enhanced-write-bandwidth caching stream 14 is reduced by the enhanced throttling mechanism 26 with respect to the throughput of the buffered latency-sensitive write stream 32.

The enhanced throttling mechanism 26 maintains a budgeted or apportioned group of clean data blocks, or blocksets, associated with a special caching namespace, the enhanced-write-bandwidth address space 12. For example, in an embodiment, the special caching namespace includes a logical block address (LBA) space defined by NVM Express (NVMe) or other specification for accessing storage devices attached through a high-speed serial computer expansion bus, such as a storage bus complying with the Peripheral Component Interconnect Express (PCIe) standard. As known in the art, the PCIe/NVMe storage interface enables host system creation, resizing and deletion of logical namespaces.

In general operation, other write streams, such as the general host write steam 54, are unaware of the enhanced-write-bandwidth address space 12 and do not have access to the write-bandwidth-enhanced address space 12. Similarly, the general throttling mechanism 22 is unaware of the budgeted or apportioned group of clean data blocks, or blocksets, associated with the special caching namespace, or enhanced-write-bandwidth address space 12. As a result, in general, other write streams, including the general host write steam 54, are throttled by the general throttling mechanism 22 earlier than the write-bandwidth-enhanced caching stream 14 is reduced by the enhanced throttling mechanism 26.

In an alternative embodiment, the enhanced-write-bandwidth address space 12 and the general address space 18 share a common available blockset pool. In other words, the enhanced-write-bandwidth available blockset pool 16 and the general available blockset pool 20 are consolidated, and both the enhanced-write-bandwidth address space 12 and general address space 18 draw from the consolidated available blockset pool. In this case, the general throttling mechanism 22 is triggered by a predetermined consolidated throttling threshold regarding the total amount of programmable space available in the consolidated pool.

For example, a parameter that is provided to the general throttling mechanism 22 representing the number of data blocks, or blocksets, currently available for programming is reduced by the current amount of caching namespace, or enhanced-write-bandwidth address space 12, that currently is available for programming. For example, the parameter "clean_blocksets" represents the number of blocksets currently available for programming in the storage system 10, and the modified parameter "adjusted_clean_blocksets," defined as the number of blocksets currently available for programming in the storage system 10 reduced by the caching capacity in the enhanced-write-bandwidth address space 12 currently available for programming, is presented to the general throttling mechanism 22 according to the following equation:

adjusted_clean_blocksets=clean_blocksets−(caching_capacity−cached_data_written)

In this equation, "caching_capacity" is defined as the size (in units of blocksets) of the caching namespace, or enhanced-write-bandwidth address space 12, without additional overprovisioning. Additionally, "cached_data_written" is the amount of data (in units of blocksets) that has been written to the namespace.

In this example, the modified parameter "adjusted_clean_blocksets" is used by the general throttling mechanism 22 to determine if the throttling threshold 58 is reached. If the current value of the parameter "adjusted_clean_blocksets" is below the level of the throttling threshold 58, then the general throttling mechanism 22 reduces the throughput of the reclamation-balanced host write stream 36, even though the total amount of storage space currently available for programming in the storage device 10, including available blocksets assigned to the enhanced-write-bandwidth address space 12, is greater than the throttling threshold 58.

In an alternative embodiment, the host throttle metric has granularity finer than the blockset size, and the alternative modified parameter "adjusted_free_apace" may be presented to the general throttling mechanism 22 according to the following equation:

adjusted_free_space=free_space−(caching_capacity−cached_data_written)

Thus, in general, the enhanced-write-bandwidth address space 12 is continuously maintained as a reserved caching namespace for use by latency-sensitive write requests 44 from the host system 48. The enhanced-write-bandwidth caching stream 14 is reduced by the enhanced throttling mechanism 26 only in the case that the enhanced-write-bandwidth address space 12 becomes full, that is, when there is no programmable space currently remaining in the enhanced-write-bandwidth address space 12. The enhanced-write-bandwidth caching stream 14 effectively bypasses the enhanced throttling mechanism 26 whenever "caching_capacity" is greater than "cached_data_written."

In general, the host system 48 and the storage system 10 must maintain independent flow with regard to the general stream and the latency-sensitive, or enhanced, stream of write requests. Various configurations and methods can be implemented to accomplish this goal.

In some embodiments, the host system 48 implements separate physical streams corresponding to the latency-sensitive write stream 52 and the general host write stream 54, with independent buffering resources dedicated to the general host write requests 34 and the latency-sensitive write requests 44. In this case, the buffers can operate, for example, using a first-in-first-out (FIFO) method. Thus, the physical flow is implemented essentially as the conceptual flow illustrated in the host system 48 of FIG. 1.

In other embodiments, the host system 48 may be implemented using a physical configuration that does not correspond to the conceptual flow, but nonetheless accomplishes essentially the same principle. For example, the latency-sensitive write stream 52 and the general host write stream 54 may be implemented in a single physical stream, and the general host write requests 34 and latency-sensitive write requests 44 may be stored in a single queue from which the host system 48 has the ability to selectively forward write requests in a different order than these enter the queue.

Similarly, in some embodiments the buffered host write stream 30 and the buffered latency-sensitive write stream 32 are implemented in separate physical streams, for example, independent storage buses or communication networks. In other embodiments, the buffered host write stream 30 and buffered latency-sensitive write stream 32 may be physically implemented in a consolidated storage bus or communication network.

In an embodiment, the storage system 10 implements separate physical resources for the general stream of write requests (including, for example, the general throttling mechanism 22, the reclamation-balanced host write stream 36 and the aggregate general write stream 42) versus the latency-sensitive, or enhanced, stream of write requests (including, for example, the enhanced throttling mechanism 26 and the enhanced-write-bandwidth caching stream 14).

Other embodiments that share resources among the write streams while maintaining independent flows between the write streams may be implemented. As an example, in some embodiments, the general throttling mechanism 22 and the enhanced throttling mechanism 26 use shared resources. As another example, one or more shared buffers may be implemented from which the storage system 10 has the ability to selectively forward write requests in a different order than these arrive.

In general, when "cached_data_written" is equal to "caching_capacity" the reserved space in the enhanced-write-bandwidth address space 12 accounted for by "adjusted_clean_blocksets" is exhausted, and the caching namespace is considered to be full. In this state, the write bandwidth generally reserved for the enhanced-write-bandwidth caching stream 14 cannot be guaranteed, and the enhanced-write-bandwidth address space 12 behaves in the same manner as other namespaces in the storage system 10. That is, during periods when the data cached in the caching namespace reaches the capacity of the enhanced-write-bandwidth address space 12, the enhanced throttling mechanism 26 temporarily modifies the throughput of the enhanced-write-bandwidth caching stream 14.

Data sets stored in the enhanced-write-bandwidth address space 12 can be defined to have a lifecycle that includes an invalidation step that indicates when the data no longer includes valid entries or entries that are duplicated in a transfer buffer so that the storage space can be reclaimed. In an embodiment, a TRIM command is sent to the storage system 10 by the operating system of the host system 48 to indicate invalid data in the enhanced-write-bandwidth address space 12.

The TRIM command informs the storage system 10 that the invalidated data is no longer useful and permits the reclamation engine 28 to reclaim the corresponding storage space. The TRIM command reduces the value of "cached_data_written" by the quantity of data trimmed. If a host system 48 subsequently attempts to read the invalidated data, the storage system 10 can return the obsolete data or a sequence of zeroes. In general, host purges can be invoked as background erasures as part of the storage system TRIM command processing routine.

In an embodiment, the garbage collection blockset selection algorithm utilized by the reclamation engine 28 operates asynchronously with respect to the general throttling mechanism 22. However, the garbage collection blockset selection algorithm must also use the "adjusted_clean_blocksets" parameter to ensure the reclamation engine 28 operates whenever the host general throttling mechanism 22 engages. Otherwise, the garbage collection selection algorithm is unchanged from conventional nonvolatile memory management systems known in the art.

It is desirable to guarantee, to the extent practicable, that the reclamation process operates at a faster rate than incoming host writes. Toward this end, it is desirable to provide embodiments that avoid garbage collection overhead, that is, implementations that generally do not require resources to move valid data to other data blocks, or blocksets, before performing erasures. Such implementations ensure that only erasure of data blocks, or blocksets, (without relocation of valid data) in the enhanced-write-bandwidth address space 12 is required before reprogramming, permitting nearly instantaneous reuse of data blocks, or blocksets, in the enhanced-write-bandwidth address space 12.

In one such embodiment, the host system 48 is required to purge the enhanced-write-bandwidth address space 12 before the data cached in the caching namespace reaches the capacity of the enhanced-write-bandwidth address space 12. The host system 48 is required to invalidate data in the enhanced-write-bandwidth address space 12 after the data is no longer useful, but no later than when the value of "cached_data_written" becomes equal to "caching_capacity" to ensure there is no garbage collection overhead during the purge.

In this embodiment, the host system 48 is permitted to perform write requests using any access pattern with respect to data blocks, or logical block addresses. However, the host system 48 is not permitted to write more than the number of LBAs equal to the size of the enhanced-write-bandwidth address space 12 before purging the caching namespace. Thus, the host system 48 must track the number of LBAs written in the caching namespace since the last purge, and invalidate all valid data in memory cells pertaining to the enhanced-write-bandwidth address space 12 at an interval not exceeding the number of host writes equaling the capacity of the enhanced-write-bandwidth address space 12.

For example, after writing enough LBAs to fill the enhanced-write-bandwidth address space 12, the host system 48 may perform an explicit TRIM command with respect to all currently valid LBAs pertaining to the caching namespace. Otherwise, in a simplified procedure, the host system 48 may perform a TRIM command with respect to the entire enhanced-write-bandwidth address space 12. This host system purge requirement is important to sustain a desired or guaranteed performance profile.

In another such embodiment, a restriction is placed upon the host system 48 requiring that latency-sensitive write requests 44 invalidate data blocks or logical block addresses (LBAs) in the same order that the logical block addresses were previously written. In this case, the host system 48 is not required to perform explicit TRIM commands with respect to the caching namespace. In a simplified procedure, the host system 48 may sequentially write and rewrite logical block addresses in latency-sensitive write requests 44.

In this embodiment, the storage system 10 reserves one blockset of overprovisioned space, which is not visible to the host system 48. The reserved blockset permits transition from a programmed state to an erased state while the caching namespace is at full capacity.

In effect, this implementation permits the host system 48 to continuously write to the caching namespace without throttling, because in conventional storage systems, erase bandwidth is greater than host-write bandwidth. As a result, this write access pattern restriction on the host system 48 virtually ensures that the reclamation process will outperform arriving write requests, such that latency-sensitive write requests 44 will virtually never be delayed during normal system operation.

These implementations, including the requirements placed on the host system 48, are intended to ensure that programmable space remains available in the enhanced-write-bandwidth address space 12 during all normal operating conditions. Effectively, the enhanced-write-bandwidth address space 12 is continuously maintained as a reserved caching namespace for use by latency-sensitive write requests 44 from the host system 48.

In a further embodiment, the storage system 10 implements a verification check to ascertain that the host system 48 obeys the write access pattern restriction. If the storage system 10 determines the rule has been violated, then the storage system 10 can temporarily operate the enhanced-write-bandwidth address space 12 in the same manner as the general address space 18 until such time that the storage system 10 is able to verify host system compliance.

In some embodiments, additional write resources with respect to conventional systems are assigned to the enhanced-write-bandwidth caching stream 14 to ensure reclamation activities and general host write requests 34 that generally are subject to throttling do not block latency-sensitive write requests 44 directed to the enhanced-write-bandwidth address space 12. In an embodiment, dedicated write resources are reserved in the storage device logic circuitry for the enhanced-write-bandwidth caching stream 14. The required resources depend on the storage device architecture and are specific to the particular implementation.

In an alternative embodiment, the storage system 10 sends asynchronous notifications to the host system 48 regarding the enhanced-write-bandwidth address space 12. For example, the storage system 10 may send a notification to the host system 48 indicating that the enhanced-write-bandwidth address space 12 is ready, or indicating the enhanced-write-bandwidth address space 12 is full.

Implementation of the enhanced-write-bandwidth address space 12 and the enhanced-write-bandwidth caching stream 14 can be applied to any storage system that utilizes reclamation (garbage collection) in order to provide limited-capacity, on-demand write bandwidth for use in particular nonvolatile storage use cases that are relatively sensitive to write latency. Various embodiments can deliver relatively high write performance to host systems on an on-demand basis for relatively limited amounts of data.

For example, the enhanced-write-bandwidth address space 12 can be utilized to save a write burst containing the host system memory contents and processor state during the initiation of host system hibernation mode, or to save logging information. Laptop computers generally enter hibernation mode by saving a data burst from non-persistent memory to nonvolatile memory. The data burst is relatively latency-sensitive, because the time required to store the data burst directly affects the hibernation time experienced by users. Upon power-up, the host system reads the data into memory. After the data set has been read into memory, the data in the caching namespace is no longer useful and can be invalidated (trimmed).

The reservation of overprovisioned space in the storage system 10 for use in the enhanced-write-bandwidth address space 12 results in a tradeoff regarding write amplification and performance in the general address space 18. However, the resulting effect is essentially minimized in an embodiment where the enhanced-write-bandwidth address space 12 is much smaller than the total budgeted or apportioned overprovisioned space in the storage system 10.

In an alternative embodiment, the special caching namespace includes a logical namespace associated with a logical unit number (LUN) defined by a serial-attached SCSI (SAS) standard. In another alternative embodiment, the special caching namespace is defined as an LBA range in the global (LUN 0) LBA space on the storage device. In general, the caching namespace may be specified by the host and communicated to the storage device in any manner known in the art.

In other alternative embodiments, multiple instances of caching namespaces, or enhanced-write-bandwidth address spaces, are reserved in a single storage system. In addition, in an embodiment, multiple instances of caching namespaces are presented to the host system as a single customer-visible namespace with customer-defined logical block address boundaries.

Figure 2:
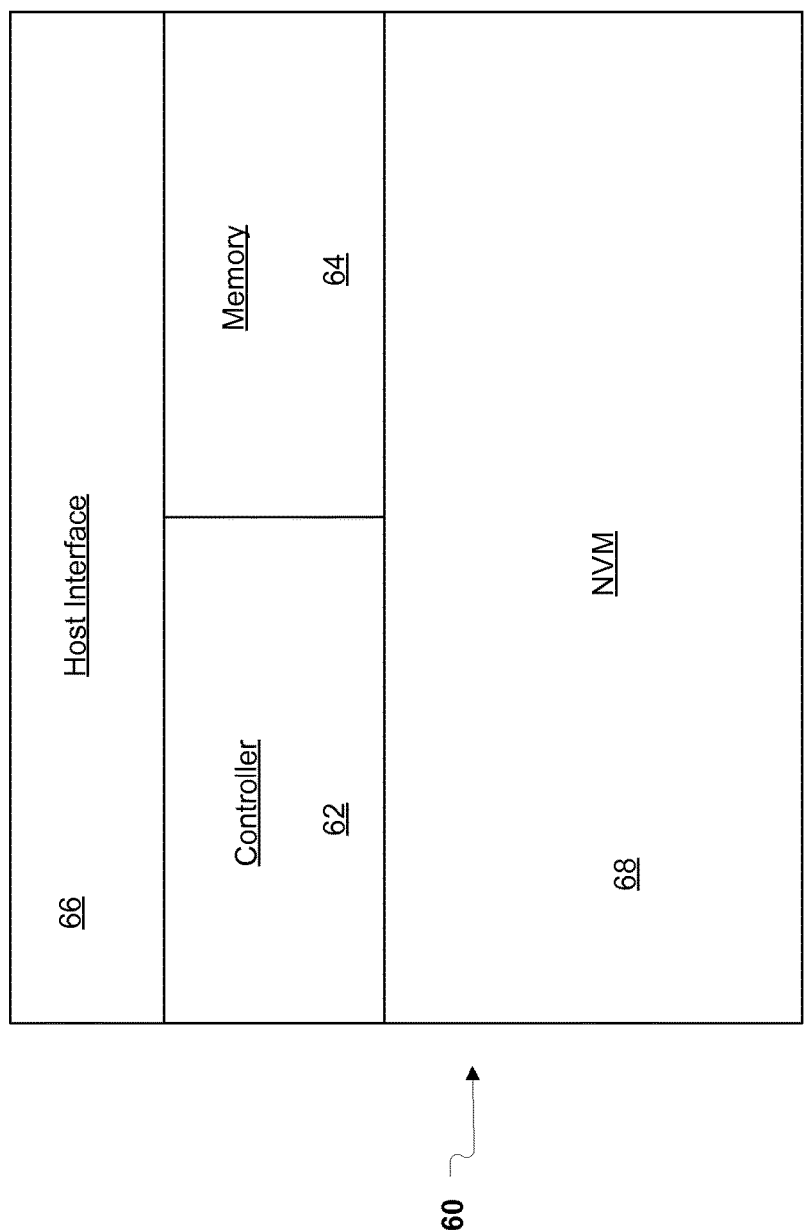
FIG. 2 is a block diagram illustrating an exemplary storage device that can employ an enhanced-write-bandwidth address space to implement the enhanced-write-bandwidth caching stream of FIG. 1 in accordance with an embodiment of the present invention.

As illustrated in FIG. 2, an exemplary storage device 60 that can implement the enhanced-write-bandwidth caching stream 14 of FIG. 1, for example, in conjunction with a host system, includes a controller 62, a memory 64, a host interface 66, and nonvolatile memory (NVM) 68. In an embodiment, the storage device 60 includes a NAND-flash based solid-state drive (SSD).

The controller 62 may include any general or application-specific digital processor suitable for controlling a storage device. The memory 64 may include any digital memory device suitable for storing data and instructions for access by the controller 62. The host interface 66 may include any networking interface suitable for communicatively connecting the storage device 60 to a host system. The host interface 66 may implement a storage networking standard, for example, NVM Express (NVMe) or SAS (serial-attached Small Computer System Interface [SCSI]). The nonvolatile memory 68 may include, for example, NAND flash memory chips, or any other suitable nonvolatile memory known in the art.

Programming code, such as source code, object code or executable code, stored on a computer-readable medium, including firmware, can be executed by the controller 62 in order to perform the functions of the enhanced-write-bandwidth caching stream 14 of FIG. 1.

Figure 3:
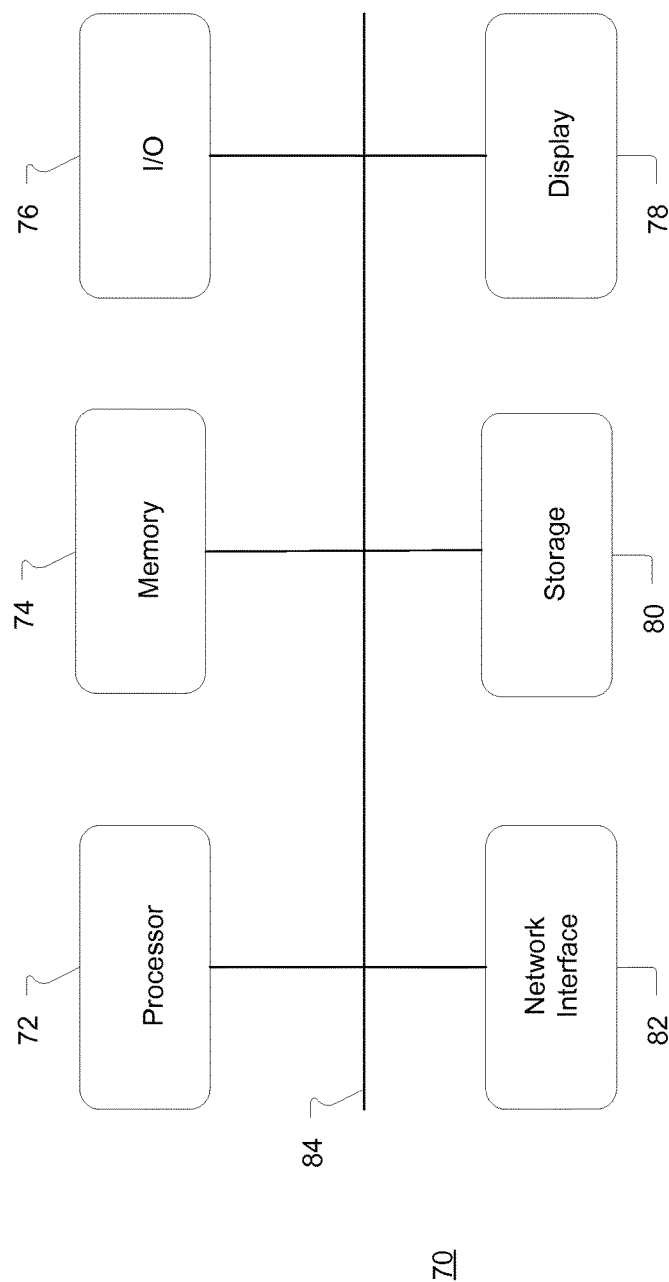
FIG. 3 is a block diagram illustrating an exemplary general computing system that can implement the host system of FIG. 1 in accordance with an embodiment of the present invention.

As illustrated in FIG. 3, an exemplary general computing device 70 that can be employed as a host system 48 to implement the enhanced-write-bandwidth caching stream 14 of FIG. 1, for example, in conjunction with a storage device, includes a processor 72, a memory 74, an input/output device (I/O) 76, a display device 78, a storage 80 and a network interface 82. The various components of the computing device 70 are coupled by a local data link 84, which in various embodiments incorporates, for example, an address bus, a data bus, a serial bus, a parallel bus, or any combination of these.

In various embodiments, the computing device 70 can include, for example, a server, a controller, a workstation, a mainframe computer, personal computer (PC), a computing tablet, a personal digital assistant (PDA), a smart phone, a wearable device, or the like. Programming code, such as source code, object code or executable code, stored on a computer-readable medium, such as the storage 80 or a peripheral storage component coupled to the computing device 70, can be loaded into the memory 74 and executed by the processor 72 in order to perform the functions of the host system 10.

Figure 4:
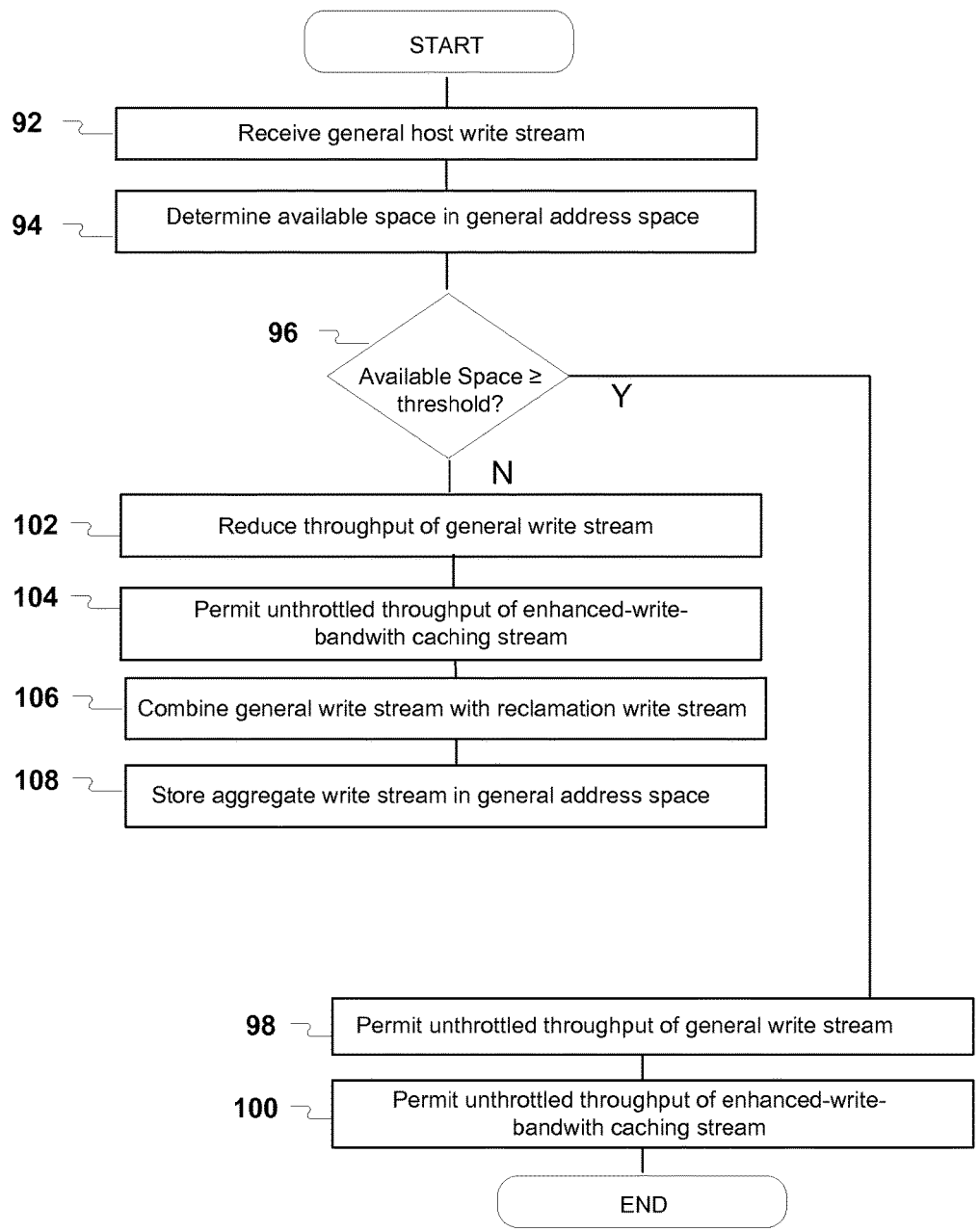
FIG. 4 is a process flowchart representing an exemplary method of implementing an enhanced-write-bandwidth storage caching stream in accordance with an embodiment of the present invention.

Referring now to FIG. 4, an exemplary process flow is illustrated that may be performed, for example, by the storage system 10 of FIG. 1 to implement an embodiment of the method described in this disclosure for employing an enhanced-write-bandwidth address space in order to implement an enhanced-write-bandwidth caching stream. The process begins at block 92, where a general host write stream is received, as described above.

In block 94, the amount of available space of memory cells currently available for programming in the general address space is determined, as explained above. For example, the number of blocksets available for programming in the caching namespace, or enhanced-write-bandwidth address space, is subtracted from the total number of blocksets available for programming in both the general address space and the caching namespace.

In block 96, the amount of available space in the general address space is compared to a predetermined threshold, as described above. If the current available space in the general address space is greater than or equal to the threshold, then the general write stream is permitted unthrottled throughput in block 98 and the enhanced-write bandwidth caching stream is permitted unthrottled throughput in block 100.

Otherwise, if the current available space is less than the threshold, then the general write stream is reduced, or throttled, in block 102 to approximately balance the general write stream with the reclamation rate, as explained above. In any case, regardless of the available space in the general address space, the enhanced-write bandwidth caching stream is permitted unthrottled throughput in block 104.

As described above, in block 106, the general write stream is combined with the reclamation write stream to create an aggregate write stream, which is stored in the general address space in block 108.

Figure 5:
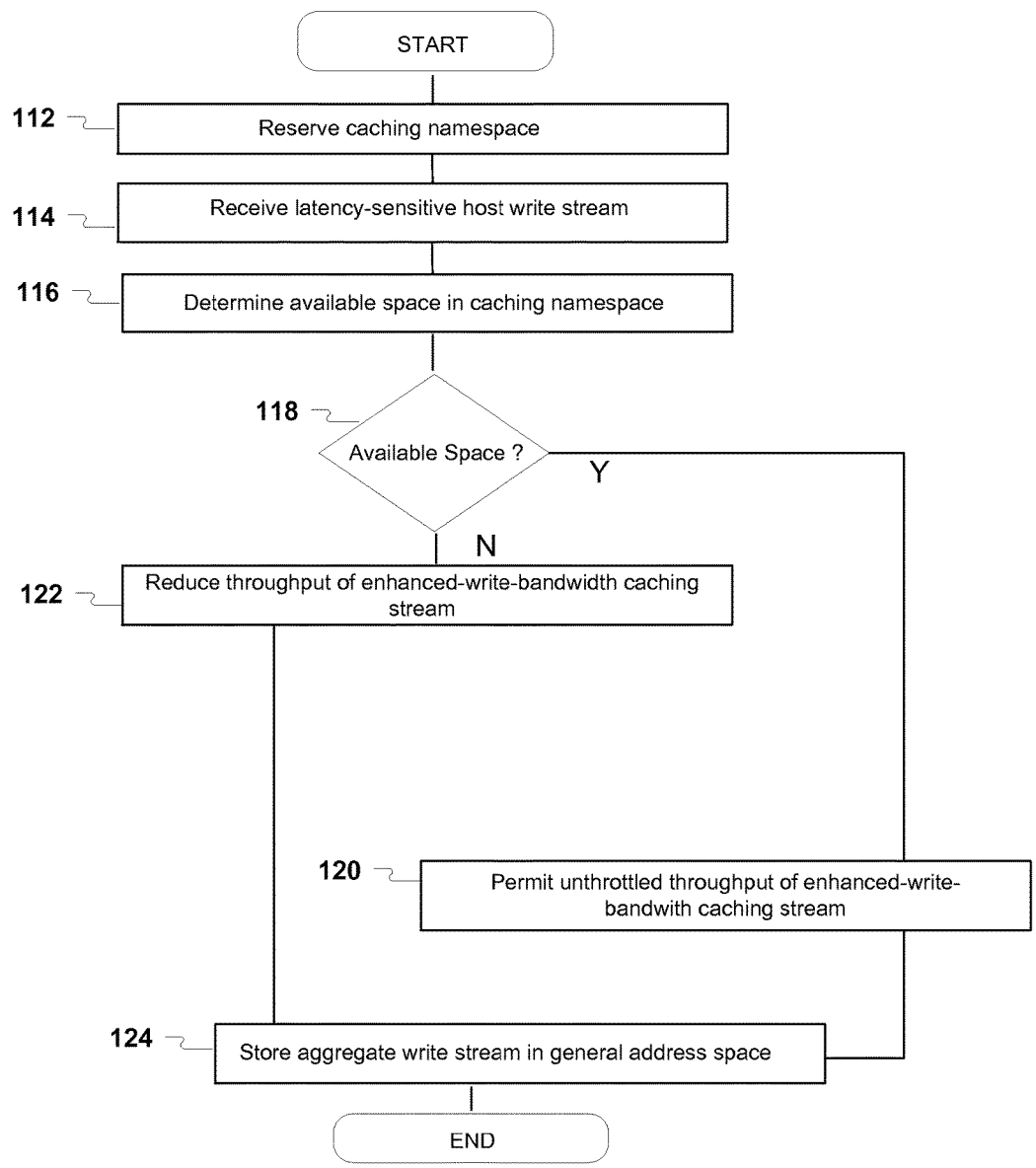
FIG. 5 is a process flowchart representing another exemplary method of implementing an enhanced-write-bandwidth storage caching stream in accordance with an embodiment of the present invention.

Referring to FIG. 5, another exemplary process flow is illustrated that may be performed by the storage system 10 of FIG. 1, for example, in conjunction with the process flow of FIG. 4, to implement an embodiment of the method described in this disclosure for employing an enhanced-write-bandwidth address space in order to implement an enhanced-write-bandwidth caching stream. The process begins at block 112, where a caching namespace, or enhanced-write-bandwidth address space, is reserved apart from the general address space at the request of the host, as explained above.

In block 114, a latency-sensitive host write stream is received, as described above. In block 116, the amount of available space of memory cells currently available for programming in the caching namespace is determined, as explained above. If the available space in the caching namespace is greater than zero, in block 118, then the enhanced-write-bandwidth caching stream is permitted unthrottled throughput in block 120.

Otherwise, if the available space in the caching namespace equals zero in block 118, then the throughput of the enhanced-write-bandwidth caching stream is reduced, or throttled, in block 122, as further explained above. In block 124, the enhanced-write-bandwidth caching stream is stored in the caching namespace, as described above.

Figure 6:
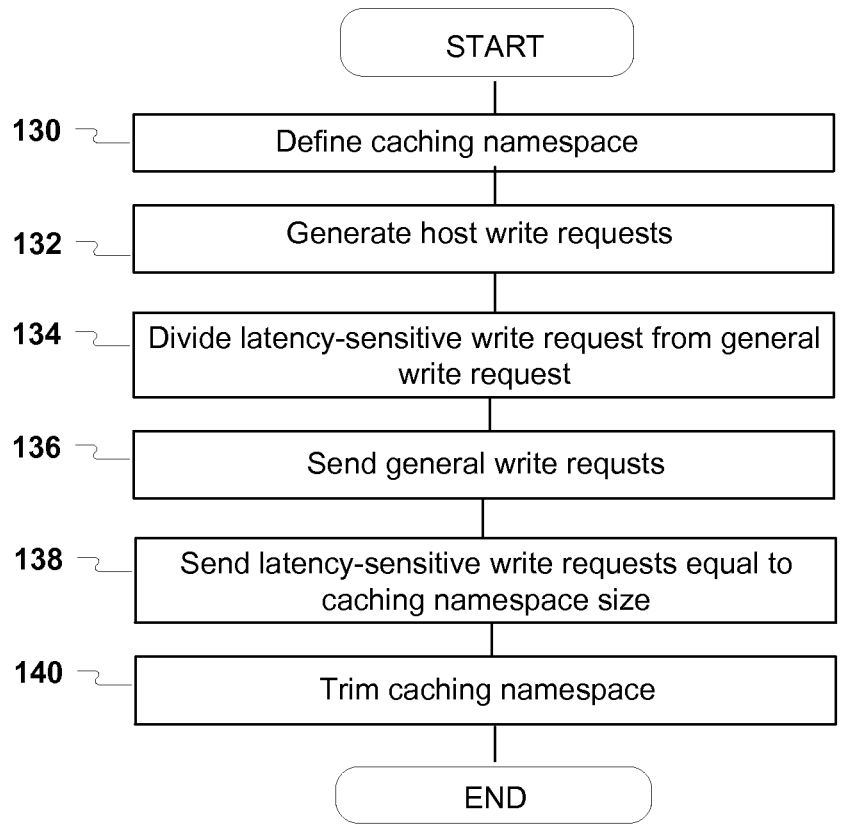
FIG. 6 is a process flowchart representing an exemplary method of implementing an enhanced-write-bandwidth host caching stream in accordance with an embodiment of the present invention.

Referring to FIG. 6, an exemplary process flow is illustrated that may be performed by the host system 48 of FIG. 1, for example, in conjunction with the process flows of FIGS. 4 and 5, to implement an embodiment of the method described in this disclosure for employing an enhanced-write-bandwidth address space in order to implement an enhanced-write-bandwidth caching stream. The process begins at block 130, where the caching namespace is defined, as explained above. For example, the host specifies a logical namespace in accordance with the NVMe standard.

In block 132, the host generates write requests, and in block 134, the host write requests are divided, or separated, into latency-sensitive write requests and general write requests, as described above. In block 136 the general write requests are sent, for example, to a storage device. A number of latency-sensitive write requests sufficient to equal the size of the caching namespace are sent, for example, to the storage device, in block 138. As explained above, a TRIM command is sent with respect to currently valid logical block addresses (LBAs) corresponding to the latency-sensitive write requests, in block 140.

Figure 7:
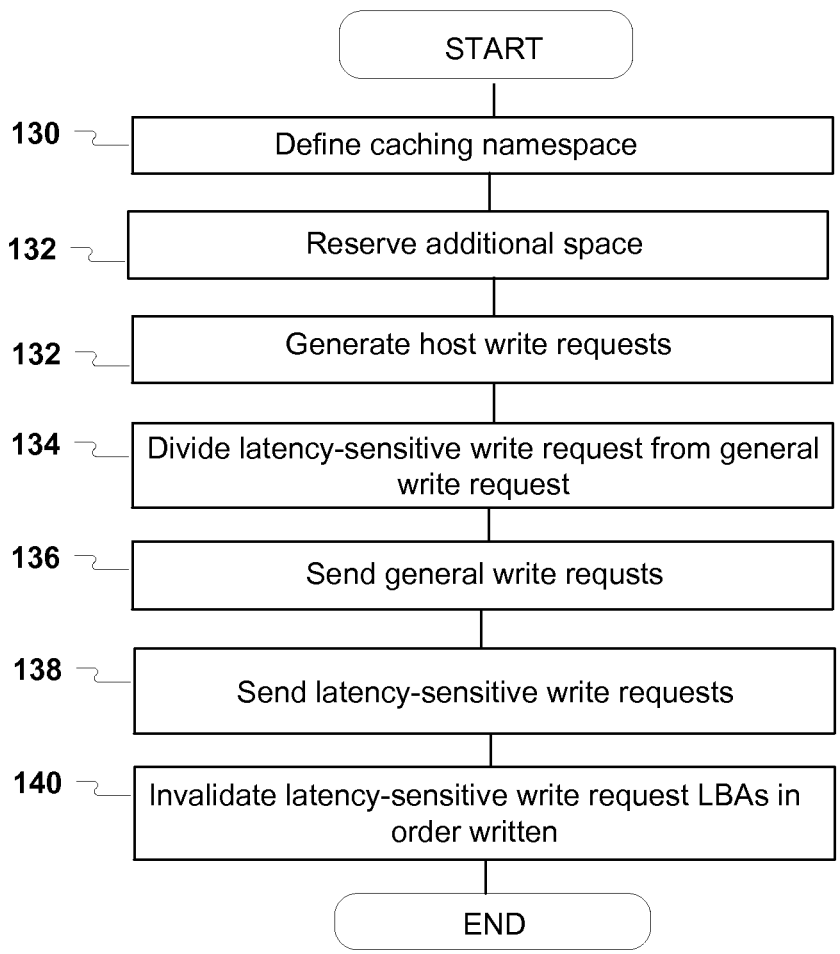
FIG. 7 is a process flowchart representing another exemplary method of implementing an enhanced-write-bandwidth host caching stream in accordance with an embodiment of the present invention.

Referring to FIG. 7, an exemplary process flow is illustrated that may be performed by the host system 48 of FIG. 1, for example, in conjunction with the process flows of FIGS. 4 and 5, to implement an embodiment of the method described in this disclosure for employing an enhanced-write-bandwidth address space in order to implement an enhanced-write-bandwidth caching stream. The process begins at block 142, where the caching namespace is defined, as explained above.

In block 144, additional overprovisioned space, for example, one additional blockset, is reserved to allow erasure transition while caching namespace is at capacity, as explained above. In block 146, the host generates write requests, and in block 148, the host write requests are divided, or separated, into latency-sensitive write requests and general write requests, as described above.

In block 150 the general write requests are sent, for example, to a storage device. Latency-sensitive write requests also are sent, for example, to the storage device, in block 152. As explained above, logical block addresses (LBAs) corresponding to the latency-sensitive write requests are invalidated, in block 154, in the same order that the respective LBAs were previously written.

Aspects of this disclosure are described herein with reference to flowchart illustrations or block diagrams, in which each block or any combination of blocks can be implemented by computer program instructions. The instructions may be provided to a processor of a general purpose computer, special purpose computer, or other programmable data processing apparatus to effectuate a machine or article of manufacture, and when executed by the processor the instructions create means for implementing the functions, acts or events specified in each block or combination of blocks in the diagrams.

In this regard, each block in the flowchart or block diagrams may correspond to a module, segment, or portion of code that including one or more executable instructions for implementing the specified logical function(s). It should also be noted that, in some alternative implementations, the functionality associated with any block may occur out of the order noted in the figures. For example, two blocks shown in succession may, in fact, be executed substantially concurrently, or blocks may sometimes be executed in reverse order.

A person of ordinary skill in the art will appreciate that aspects of this disclosure may be embodied as a device, system, method or computer program product. Accordingly, aspects of this disclosure, generally referred to herein as circuits, modules, components or systems, may be embodied in hardware, in software (including firmware, resident software, micro-code, etc.), or in any combination of software and hardware, including computer program products embodied in a computer-readable medium having computer-readable program code embodied thereon.

It will be understood that various modifications may be made. For example, useful results still could be achieved if steps of the disclosed techniques were performed in a different order, and/or if components in the disclosed systems were combined in a different manner and/or replaced or supplemented by other components. Accordingly, other implementations are within the scope of the following claims.

What is claimed is:

1. An apparatus for implementing an enhanced-write-bandwidth caching stream, the apparatus comprising:
a processor; and
a memory storing machine instructions thereon that, when executed by the processor, configure the processor to:
receive a first host write stream in a first address space and a second host write stream, different from the first host write stream, comprising latency-sensitive host write requests in a second address space comprising a logical namespace;
determine a total currently available memory space for programming associated with the first address space and the second address space;
determine a memory space available for programming in the first address space based on a difference between the total available space and a memory space available for programming in the second address space;
compare the memory space available for programming in the first address space with a predetermined threshold;
subject, based on the available memory space not exceeding the threshold, the first host write stream to host-write throttling by reducing a first throughput of the first host write stream, while permitting an unthrottled throughput of the second host write stream,
invalidate logical blocks associated with the second host write stream in an order corresponding to a previous order in which the respective logical blocks were previously programmed.

2. The apparatus of claim 1, wherein the machine instructions, when executed, further configure the processor to require the second host write stream program the logical blocks in a sequential order.

3. The apparatus of claim 1, wherein the machine instructions, when executed, further configure the processor to require the second host write stream invalidate a previously-programmed logical block address in the second address space before an available space of memory cells currently available for programming associated with the second address space reaches zero.

4. The apparatus of claim 1, wherein to exempt the second host write stream from host-write throttling the machine instructions, when executed, further configure the processor to determine second available space of memory cells currently available for programming associated with the second address space, and permit an unthrottled throughput of the second host write stream while the second available space is greater than zero.

5. The apparatus of claim 1, wherein the machine instructions, when executed, further configure the processor to store the first host write stream in the first address space and store the second host write stream in the second address space.

6. The apparatus of claim 5, wherein to store the first host write stream in the first address space the machine instructions, when executed, further configure the processor to combine the first host write stream with a reclamation write stream to form an aggregate write stream, and store the aggregate write stream in the first address space.

7. The apparatus of claim 1, wherein the machine instructions, when executed, further configure the processor to reserve an additional quantity of data blocks to the second address space, wherein the additional quantity of data blocks is equal to that over which garbage collection activities are coordinated and is not visible to a host that generates the first host write stream and the second host write stream.

8. An apparatus for implementing an enhanced-write-bandwidth caching stream, the apparatus comprising:
   a processor; and
   a memory storing machine instructions thereon that, when executed by the processor, configure the processor to:
      divide a stream of host write requests into a first host write stream comprising host write requests in a first address space and a second host write stream in a second address space different than the first address space;
      determine a total currently available memory space for programming associated with the first address space and the second address space;
      determine a memory space available for programming in the first address space based on a difference between the total available space and a memory space available for programming in the second address space;
      compare memory space available for programming in the first address space with a predetermined threshold;
      subject, based on the available memory space not exceeding the threshold, the first host write stream to host-write throttling by reducing a first throughput of the first host write stream, while permitting an unthrottled throughput of the second host write stream,
      invalidate logical blocks corresponding to the second host write stream in an order corresponding to a previous order in which the respective logical blocks were previously programmed.

9. The apparatus of claim 8, wherein the machine instructions, when executed, further configure the processor to program the logical blocks corresponding to the second host write stream in a sequential order.

10. The apparatus of claim 8, wherein the machine instructions, when executed, further configure the processor to invalidate a previously-programmed logical block address in the second address space before an available space of memory cells currently available for programming associated with the second address space reaches zero.

11. A computer-implemented method for implementing an enhanced-write-bandwidth caching stream, the method comprising:
   receiving a first host write stream and a second host write stream comprising host write requests;
   storing the first host write stream in a first address space;
   storing the second host write stream in a second address space comprising a logical namespace;
   determine a total currently available memory space for programming associated with a first address space and the second address space;
   determine a memory space available for programming in the first address space based on a difference between the total available space and a memory space available for programming in the second address space;
   compare memory space available for programming in the first address space with a predetermined threshold;
   subjecting, based on the available memory space not exceeding the threshold, a first host write stream in the first address space to host-write throttling by reducing a first throughput of the first host write stream, while permitting an unthrottled throughput of the second host write stream; and
   invalidating logical block addresses corresponding to the second address space in an order corresponding to a previous order in which the respective logical blocks were previously programmed.

12. The method of claim 11, further comprising requiring logical block addresses corresponding to the second address space be programmed in a sequential order.

13. The method of claim 11, further comprising requiring a previously-programmed logical block address in the second address space be invalidated before an available space of memory cells currently available for programming associated with the second address space reaches zero.

* * * * *